United States Patent
Damm et al.

[11] Patent Number: 5,906,463
[45] Date of Patent: May 25, 1999

[54] PROTECTIVE RING FOR RESISTING CONTACT CORROSION

[75] Inventors: Klaus Damm, Ohm; Wolfgang Sommer, Gemünden; Walter J. Mages, Alsfeld, all of Germany

[73] Assignee: Kamax-Werke Rudolk Kellermann GmbH & Co. KG, Osterode, Germany

[21] Appl. No.: 08/815,714

[22] Filed: Mar. 12, 1997

[30] Foreign Application Priority Data

Mar. 13, 1996 [DE] Germany .............. 196 09 684

[51] Int. Cl.⁶ .............. F16B 33/00; F16B 43/00
[52] U.S. Cl. .......... 411/369; 411/377; 411/431; 411/533; 411/542
[58] Field of Search .................. 411/369, 372, 411/373, 377, 431, 533, 542, 544, 915

[56] References Cited

U.S. PATENT DOCUMENTS

| | | | |
|---|---|---|---|
| 3,519,279 | 7/1970 | Wagner | 411/542 |
| 4,026,183 | 5/1977 | Bart . | |
| 4,092,896 | 6/1978 | Puchy | 411/542 |
| 4,235,147 | 11/1980 | Weidner, Jr. | 411/542 X |
| 4,280,390 | 7/1981 | Murray | 411/542 |
| 4,452,556 | 6/1984 | Nelson et al. | 411/377 |
| 4,482,278 | 11/1984 | Dorn | 411/542 X |
| 4,712,802 | 12/1987 | Hewison et al. | 411/542 |
| 5,165,834 | 11/1992 | Takenouchi et al. | 411/533 X |

FOREIGN PATENT DOCUMENTS

| | | |
|---|---|---|
| 2 624 578 | 6/1989 | France . |
| 31 36 671 A1 | 5/1982 | Germany . |
| 44 39 567 A1 | 6/1995 | Germany . |
| 195 08 977 | 7/1996 | Germany . |
| 883464 | 11/1961 | United Kingdom . |
| 883909 | 12/1961 | United Kingdom . |
| 1 263 548 | 2/1972 | United Kingdom . |

*Primary Examiner*—Neill Wilson
*Attorney, Agent, or Firm*—Thomas, Kayden, Horstemeyer & Risley

[57] ABSTRACT

A protective ring for resisting contact corrosion for a connecting element such as a screw which can be fitted to a component and which has a bearing surface for bearing against the component includes a sealing ring of plastic material. The sealing ring is carried on the connecting element in such a position that before the connecting element is tightened the sealing ring provides a bead which projects in the axial direction beyond the bearing surface and which, upon tightening of the connecting element, can be permanently axially braced relative to the component to form an annular sealing surface which extends around the contact surface between the connecting element and the component. The sealing ring has a protective sheathing for the connecting element, which projects in the opposite direction to the bead.

10 Claims, 4 Drawing Sheets

PROTECTIVE RING FOR RESISTING CONTACT CORROSION

FIELD OF THE INVENTION

The invention concerns a protective ring for resisting contact corrosion for a connecting element such as a screw which can be fitted to a component and which has a bearing surface, including a sealing ring of plastic material.

The term contact corrosion is used to denote galvanic corrosion which occurs at components which are to be screwed with connecting elements when the component comprises a chemically more base material in comparison with the connecting element so that, when an electrolyte is present in relation to the assembly consisting of the component and the connecting element, a galvanic cell is formed in which the more base metal forms the anode.

The invention relates more especially to components of magnesium alloys, which can be used in vehicle construction, and connecting elements consisting of steel.

BACKGROUND OF THE INVENTION

An electrically conductive contact between a component as referred to above, consisting of a more base metal, and a connecting element comprising a comparatively more noble metal cannot generally be satisfactorily avoided if substantial pressing or biasing forces are to be transmitted by means of the connecting element. At any event direct contact is an optimum consideration for applying and maintaining a biasing force. In contrast, an accumulation of electrolyte at that contact location between the connecting element and the component, which can occur solely due to moisture from the atmosphere, can be at least reduced or even prevented by using a protective ring.

A protective ring for resisting contact corrosion between a connecting element such as a screw which can be fitted to a component and which has a bearing surface, and the component itself, including a sealing ring of plastic material, is disclosed in DE 44 39 567. The protective ring is in the form of a cap consisting of plastic material, with and without an opening therethrough. If the protective ring does not have an opening therethrough, it can be fitted on to the head of the connecting element only subsequently after the connecting element has been fitted to the component to be secured thereby. If on the other hand the protective ring has an opening therethrough, it is possible to form a pre-assembled unit consisting of the connecting element and the protective ring, and that unit can then be employed for assembly purposes as it stands. The protective ring as indicated above comprises a sealing ring of plastic material and the sealing ring has as essential functional portions thereof a plurality of sealing lips which afford a sealing action in relation to the component on the one hand and in relation to the connecting element on the other hand. Such sealing lips are of a tapering cross-section and in the assembled condition of the protective ring bear more or less in linear contact against the component or the head of the connecting element respectively. The sealing lips co-operate with counterpart surfaces of a spherical or conical configuration, on the head of the connecting element. The connecting element used may be an adjusting screw. It is found that a substantial pressing force or even a biasing or prestressing force cannot be transmitted with that screw. In another design configuration of such a protective ring a part of the material of a sealing lip is clamped between the component and a bearing surface on the head of the connecting element, when the connecting element is fitted in position. That admittedly affords a good sealing action at that location in relation to contact corrosion. However, there is the disadvantage here that is not possible to prevent settlement losses and thus a drop in the biasing force originally applied by means of the connecting element, so that this connection is not always a sound one. Furthermore the use of sealing lips which are of a filigree-like structure can scarcely be reproducibly maintained precisely when dealing with loose items, as screws, nuts or the like actually are. Due to mutual contact between the loose articles there is the danger of the sealing lips suffering local damage before the connecting element in question is fitted in position. However, even if the sealing lips remain undamaged, it must be expected that the corresponding co-operation surface on the component may be in part rough and/or scored, in which case such inevitable unevenness in the co-operating surface of the component cannot be compensated for by the sealing lip. A sound reproducible sealing effect does not seem to be a viable option with that protective ring.

The journal METALL, issue 6, 1992, page 570, 'Korrosionseigenschaften von nauen Magnesiumlogierungen', A. L. OLSEN discloses a screw design for the prevention of contact corrosion, using a cap of plastic material which extends in the axial direction over the height of the head of a screw with a hexagonal recess in its head, the cap engaging with a radially inwardly directed flange into a space extending in an annular configuration around a separately provided cylindrical projection portion on the head of the screw adjoining the bearing surface thereof. That thereof involves using a plastic cover means in order to minimize the free or exposed surface area of the screw head.

SUMMARY OF THE INVENTION

An object of the present invention is to provide a protective ring for resisting contact corrosion which affords a reliable action against contact corrosion even when using connecting elements in the form of loose items while not preventing the reproducible application of a biasing force to the connecting element.

Another object of the present invention is to provide a protective ring for resisting contact corrosion which is of a generally robust nature such as to be less susceptible to damage prior to fitting thereof and which is simple to produce.

Still another object of the present invention is to provide a protective ring to resist contact corrosion which operates by virtue of a sealing configuration affording improved sealing integrity.

A still further object of the present invention is to provide a protective ring to resist contact corrosion which can be provided as a separate protective ring as a saleable unit for association with a connecting element or which can form part of a pre-assembleable unit consisting of the protective ring and the connecting element, which unit can consist a saleable unit in itself.

In accordance with the principles of the present invention, the foregoing and other objects are attained by a protective ring for resisting contact corrosion for a connecting element such as a screw which can be fitted to a component and which has a bearing surface, including a sealing ring of plastic material. In the non-fitted condition of the connecting element the sealing ring is adapted to be supported on the connecting element in such a way that there is a bead or ridge means projecting in the axial direction beyond the bearing surface of the connecting element against the component. Upon fitting of the sealing ring and the connecting element the bead or ridge means can be permanently axially braced to provide an annular sealing surface which extends at a spacing around the contact surface between the connecting element and the component. The sealing ring has a protective sheathing means for the connecting element, the sheathing means projecting in the opposite direction to the bead or ridge means.

As will be seen in greater detail from the description hereinafter of preferred embodiments of the invention, the invention turns away from the provision and use of sealing lips and instead thereof involves the use of a bead or ridge means, that is to say a comparatively less delicate portion which is not of a cross-section that tapers in a lip-like configuration, but which can be of a rounded-off cross-sectional configuration. The term bead or ridge will be used interchangeably hereinafter. Such a bead or ridge of a cross-section which involves comparatively more material is also less in danger of being damaged if such protective rings are handled alone or in conjunction with connecting elements as loose items, more specifically even when they are fed for example to a robot fitting installation. The relative dimensioning and arrangement of the sealing ring with respect to the connecting element is also an important consideration. In the non-fitted condition the bead or ridge on the sealing ring, on being axially supported on the connecting element, must project to such an extent that upon fitting of the sealing ring the bead can be permanently axially braced in relation to the component. With that bracing effect, the bead or ridge bears against the component with surface contact, and experiences corresponding deformation. That arrangement provides an annular sealing surface, in contrast to linear contact afforded by a sealing lip, with the sealing surface also extending over a certain distance in the radial direction. In that respect, the arrangement of the sealing surface which is formed is such that no material of the sealing ring or the bead can move into a position between the contact surfaces between the connecting element and the component, which would adversely affect applying and maintaining the biasing force. On the contrary the sealing surface is at a defined spacing relative to the above-mentioned contact surface. It is admittedly possible for the bead also partially to engage under the head of the connecting element, but it is also necessary then to ensure that no material of the bead can move into the contact surface between the connecting element and the component. As indicated above moreover the sealing ring has a protective sheathing means in the opposite direction to the bead or ridge. The protective sheathing means does not represent a protective cap because it has an opening, through which a tool can engage the head of the connecting element for turning same. That at the same time affords the possibility of producing a pre-assembled unit consisting of the protective ring and the connecting element so that, when fitting the connecting element equipped with the protective ring in that way, the sealing surface is formed from the bead so-to-speak automatically when the biasing force is applied, and it is possible to avoid the need for a separate filling operation as would otherwise be required for fitting a protective cap which has to be subsequently put on to the connecting element. The protective sheathing means can be of a smaller inside diameter than corresponds to the outside diameter of the head of the connecting element at that location. The essential aim of the protective sheathing means is sufficiently to prolong the path or spacing between the free or exposed surface of the connecting element on the one hand and the component on the other hand, in order to make the path for the electrolyte as long as possible. If the inside diameter of the protective sheathing means is smaller than the outside diameter of the respective portion of the connecting element, the static friction at the preassembled unit consisting of the connecting element and the protective ring affords an adequate connection between the two parts in order to ensure that they cannot be lost from each other. The sealing ring with protective sheathing means comprises plastic material, for example and more particularly a thermoplastic elastomer.

In a preferred feature of the invention, in addition to its sealing ring the protective ring may have an annular disk-like main body of metal having a through opening or the connecting element to pass therethrough, a bearing surface for bearing against the component to be secured by the connecting element, and a bearing surface for the connecting element itself. That additional disk-like main body of metal is desirable from many points of view. By virtue of its through opening, it produces a center action relative to the connecting element so that the relative position of the sealing surface formed by the bead relative to the axis of the connecting element and the protective ring can be reproducibly maintained. At the same time this arrangement also affords a centering action for the contact of the protective sheathing means against the bead of the connecting element. Finally the metal main body makes it possible to produce a non-losable unit consisting of the protective ring and the connecting element. It is thus in particular possible for the protective ring with its main body of metal to be fitted on to the shank of a screw before with the screwthread is produced on the shank by a rolling procedure. In that case the screwthread may then be of a larger outside diameter than corresponds to the diameter of the through opening in the main body. The disk-like metal main body then represents so-to-speak an intermediate member which is operatively disposed between the bearing surface for bearing against the head of the connecting element and the bearing surface for bearing against the component, but nonetheless a reproducible biasing force can be applied by virtue of the non-yielding nature of the metal main body. In addition it is possible to make the main body from a material which in terms of its electrochemical properties falls between the material of the component and the material of the connecting element. Thus by way of example and in particular a screw of steel, a disk-like main body of aluminum and a component consisting of a magnesium alloy can be combined together.

That design configuration can be defined on the basis of consideration of a support washer. It can also be considered as a support washer for a connecting element, in particular a screw, which can be fitted to a component and which has a support surface for bearing thereagainst, with an annular disk-like main body of metal which has an opening for the connecting element to pass therethrough, that washer being characterized in that there is provided a sealing ring which surrounds the main body and which has a bead or ridge means which in the non-fitted condition projects axially beyond the support surface of the main body that is towards the component, and upon fitting of the connecting element, can be permanently axially braced relative to the component, producing a sealing effect, wherein the sealing ring has a protective sheathing means for the connecting element, the sheathing means projecting in the opposite direction relative to the bead or ridge means and projecting axially beyond the bearing surface of the main body, that is remote from the component.

In accordance with a preferred feature of the invention the sealing ring of plastic material can be connected to the main body of metal. The connection can be of a releasable or non-releasable kind. For example it is possible for the sealing ring of plastic material to be secured on the main body of metal and/or for the connection to be completed by a vulcanization operation.

Another preferred feature of the invention provides that, in the region of its through opening, the main body of metal has a collar or resilient holding elements of plastic material. The peripherally extending collar or the individual resilient holding elements which are disposed at spacings from each other prevent radial motion between the main body and the connecting element upon fitting of the connecting element. That configuration provides for a particularly effective centering action. At the same time that also affords the possibility of making up a non-losable unit consisting of the protective ring and the connecting element which are non-releasably joined together.

In accordance with another preferred feature the sealing ring can be connected to the connecting element as a pre-assembleable unit. The sealing ring on the one hand and the connecting element on the other hand are adapted to each other for mutual support in the axial direction. In a particular configuration of that arrangement the connecting element may have recesses for engagement of the sealing ring and for mutual support of the connecting element and the sealing ring relative to each other. More especially the sealing ring may have projections and the connecting element may have corresponding recesses.

The sealing ring of plastic material may have a substantially radially extending pivotal flange on which are provided the axially projecting bead or ridge means and the protective sheathing which projects in the opposite direction. This embodiment involves a certain folding or pivotal movement in the flexible material of the sealing ring. By virtue of the arrangement of the pivotal flange the contact and resulting deformation of the bead or ridge means produces a pivotal movement of the protective sheathing in a direction towards the head of the connecting element, that is to say radially inwardly, whereby the sealing effect as between the protective sheathing and the connecting element is brought about or improved.

The projecting bead or ridge means on the sealing ring, in the non-fitted condition, can have a support surface which is arranged inclinedly with respect to its axis and which, when the connecting element is fitted, bears increasingly against the component and in so doing forms the sealing surface. The above-mentioned support surface which is disposed inclinedly, that is to say not at an angle of 90° relative to the axis of the sealing ring and of the connecting element, affords a specific possible way of increasingly forming the sealing surface from the bead or ridge means. That influences the way in which the deformation of the sealing ring occurs, so that the spacing between the sealing surface and the contact surface can advantageously be kept small without the danger of material of the sealing ring, upon fitting of the connecting element to the component, flowing into the gap at the contact surface between the connecting element and the component, and preventing a biasing or tightening force from being built up.

In accordance with a further preferred feature of the invention the sealing ring may have a second bead or ridge means which also projects axially and which, upon fitting of the sealing ring and the connecting element, can be permanently axially braced relative to the component, forming a further annular second sealing surface which extends around the contact surface between the connecting element and the component, while an insulating chamber is provided between the two bead or ridge means. In that case the two bead or ridge means are each deformed to constitute a respective sealing surface, thus affording even greater protection from contact corrosion. The insulating chamber formed between the two bead or ridge means is closed off relative to the atmosphere.

It will be appreciated that the invention can be embodied on the one hand on a separate protection ring which is associated as a saleable unit with a connecting element and which is assembled together with same. It is however also possible to provide a pre-assembleable unit consisting of the protective ring and the connecting element, and to market that overall unit as a saleable unit in itself. The unit can be in particular in the form of a non-losable unit in which the protective ring and the connecting element are joined together in such a way that they cannot become separated from each other.

Further objects, features and advantages of the invention will be apparent from the following description of preferred embodiments thereof.

DESCRIPTION OF PREFERRED EMBODIMENTS

Figure 3:
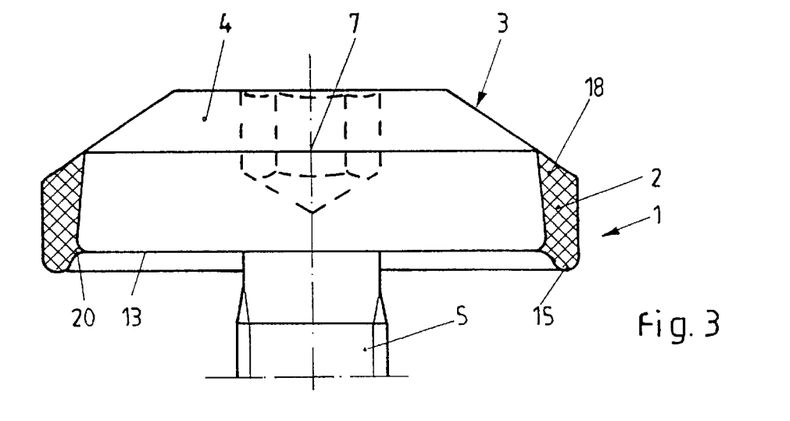
FIG. 3 shows a third embodiment of the protective ring.

Referring firstly in FIG. 3, a protective ring according to the invention for resisting contact corrosion comprises a sealing ring 2 in the form of a cylindrical casing, comprising plastic material or another suitable elastomer material. The protective ring 1 is associated with a connecting element 3 such as a screw, shown herein the form of a screw having a head 4 and a screwthreaded shank 5. The head 4 has a hexagonal recess therein for tightening and releasing the connecting element or screw 3. It will be seen from FIG. 1 that the head 4 is of a stepped configuration and has a shoulder portion 6 of reduced diameter for supporting the sealing ring 2 in the direction of the axis 7 of the connecting element 3 and the sealing ring 2. The connecting element 3 is intended to be screwed into a component which is generally indicated at 8.

Figure 1:
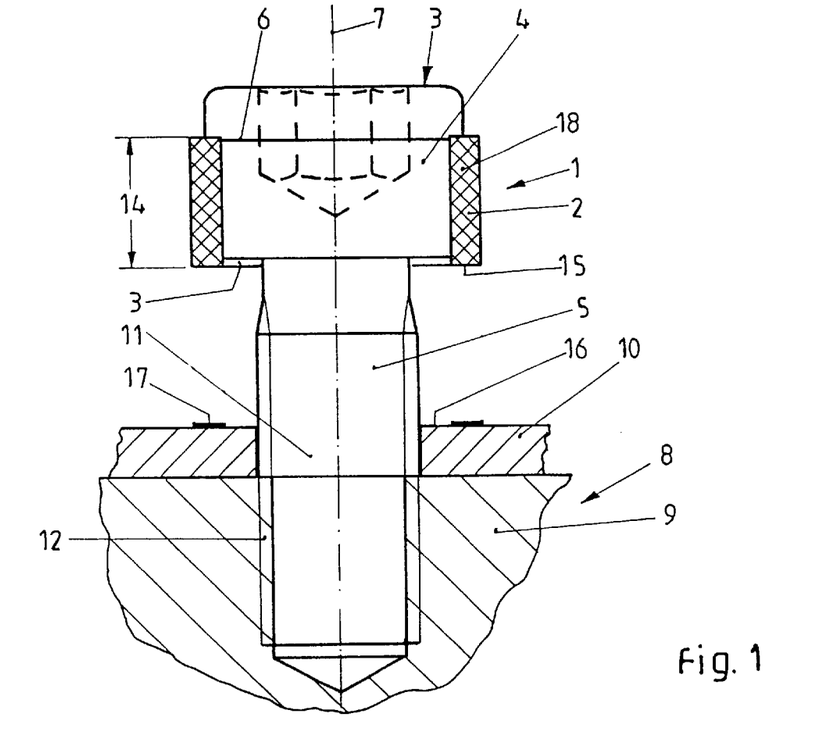
FIG. 1 shows a first embodiment of a protective ring in accordance with the invention on a connecting element.

The component 8 can comprise a housing of which just a portion is indicated at 9 and a cover 10, the connecting element 3 in this case serving to fix the cover 10 to the housing 9. The connecting element 3 generally comprises steel while the housing 9 and the cover 10 of the component 8 are made for example from a magnesium alloy, that is to say a comparatively more base metal. It will be appreciated that the cover 10 has a through opening 11 for the screwthreaded shank 5 of the connecting element 3 to pass therethrough. The housing 9 is provided with a female screwthread 12 which is matched to the male screwthread on the screwthreaded shank 5 of the connecting element 3.

For the purposes of applying the biasing or tightening force by way of the connecting element 3 to the component 8 to secure the cover 10 to the housing 9 in the illustrated embodiment, the connecting element 3 has a bearing surface indicated at 13 beneath the head 4. In the non-fitted condition, that is to say before the connecting element 3 is firmly tightened against the cover 10, the sealing ring 2 is of an axial height as indicated at 14 in FIG. 1, which is greater than the distance of the shoulder 6 from the bearing surface 13 so that, when the biasing of tightening force is applied, the sealing ring 2 is correspondingly axially compressed. At the end which is towards the component 8, the sealing ring 2 has a bead or ridge 15, that is to say not a sealing lip but a region which extends in a flat or curved configuration and which bears over a surface area against a contact surface 16 provided on the component 8, more specifically in the embodiment shown in FIG. 1 on the cover 10, whereby when the connecting element 3 is tightened against the component 8 and more particularly the cover 10, the bead 15 is permanently axially braced relative to the component 8 to form a sealing surface as indicated by the short lines 17 in FIG. 1. It is important to recognise that the sealing surface 17 involves a certain extend in the radial direction relative to the axis 7, in contrast to the substantially linear contact afforded by a sealing lip of tapered configuration.

Furthermore, in a direction away from the component 8, the sealing ring 2 has a protective sheathing 18 which bears against the head of the connecting element 4 and surrounds same. The sealing ring 2 is connected to the head 4 of the connecting element 3 in order thereby to afford a pre-assembled unit consisting of the protective ring 1 and the connecting element 3, which unit is also suitable for fitting by means of a robot installation. The sealing ring 2 is non-losably held to the connecting element 3.

Figure 2:
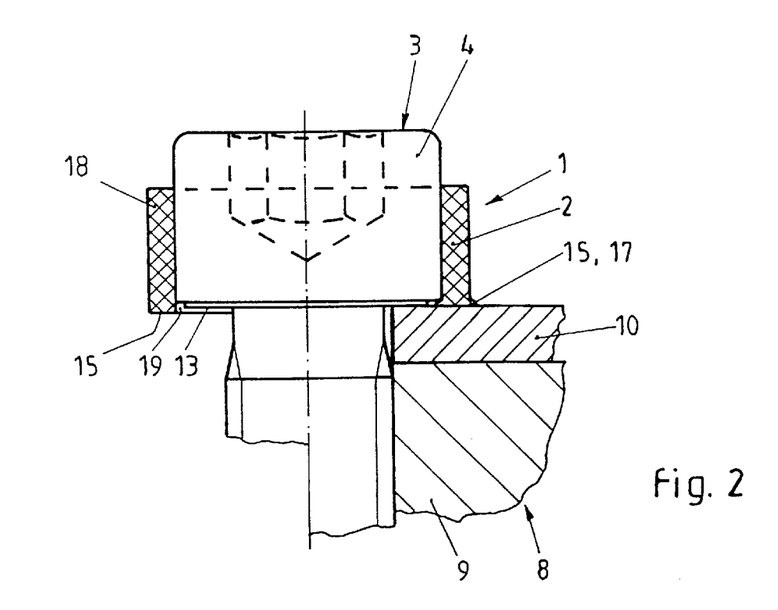
FIG. 2 shows a second embodiment of the protective ring according to the invention on a connecting element.

Reference will now be made to a second embodiment of the protective ring 1 which in this case also comprises just the sealing ring 2. The sectional view at the left-hand half of FIG. 2 shows the condition of the protective ring 1 with sealing ring 2 in which they are not fitted to a component 8, while the sectional view in the right-hand half of FIG. 2 shows the condition of the protective ring 1 in which it is fitted to the component 8 and bears against same. It can be seen more particularly that the bead 15 which in the left-hand half of FIG. 2 projects in the axial direction beyond the contact surface 13 of the connecting element 3 has been deformed to afford a sealing surface as indicated at 17 in the sectional view in the right-hand half of FIG. 2. The bearing surface 13 under the head 4 of the connecting element 3 is of a stepped configuration here and is of such a shape as to afford a free space 19, thus to provide a greater degree of certainty than in the case of the embodiment of FIG. 1, that deformable plastic material of the sealing ring 2 does not pass into the gap between the bearing surface 13 and the contact surface 16 of the component 8. The aim therefore is for direct contact of the baring surface 13 against the contact surface 16 in order to be able to apply or tightening force in a reproducible and durable manner. It will be noted that the embodiment of FIG. 2 does not have the shoulder indicated at 6 in FIG. 1. Instead of this, the sealing ring 2 is secured by vulanization or adhesive on to the head 4 of the connecting element 3, in which case the positioning of the sealing ring 2 relative to the head 4 must in this case also be such that, in the non-fitted condition, the sealing ring 2 projects axially beyond the bearing surface 13 towards the component 8, as can be clearly seen from the left-hand half of FIG. 2.

Referring now to FIG. 3, shown therein is a further embodiment of a connecting element with a protective ring 1 which is non-losably held thereto in the form of a sealing ring 2 of plastic material or other elastomer material. The sealing ring 2 is fixed on the connecting element 3 by adhesive, vulcanization, clipping engagement or in any other suitable manner. It can be seen that the bead 15 which is towards the component indicated at 8 in FIGS. 1 and 2 but not shown in FIG. 3 is here formed with a rounded-off cross-section. In this case also however the bead 15 projects in the axial direction towards the component which is indicated at 8 in FIGS. 1 and 2 but which is not shown in FIG. 3, with respect to the bearing surface 13 to the underside of the head 4. The head 4 is of a frustoconical configuration while the sealing ring 2 has once again a protective sheathing as indicated at 18, which in this case is suitable matched to the slope of the frustoconical configuration of the head 4. The transitional edge between the head 4 and the bearing surface 13 at the underside of the head 4 can be of a rounded-off configuration. It is also possible to provide here a clip-on or fixing lip 20 which promotes the connection between the sealing ring 2 and the head 4. It can bee seen from FIG 3 that the lip 20 is of substantially smaller cross section and in principal of a different configuration from the bead 15.

Figure 4:
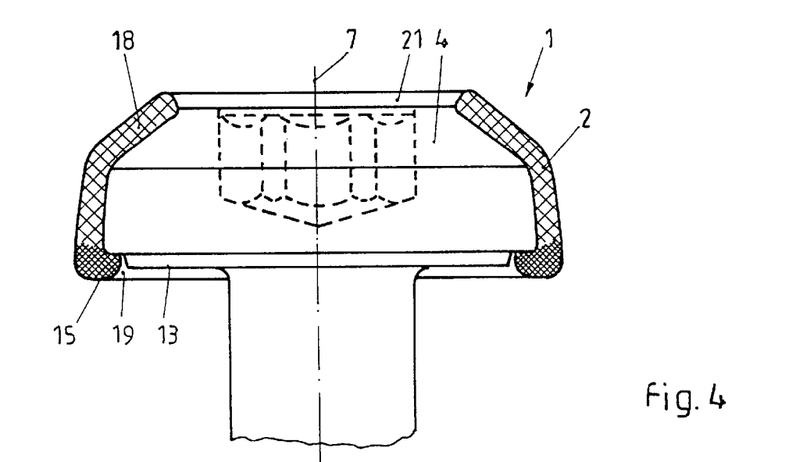
FIG. 4 shows a further embodiment of the protective ring in the form of a protective cap.

Referring now to FIG. 4, the embodiment of a protective ring 1 shown therein is more of a cap-like nature and can preferably be fitted on to the head 4 of the connecting element 3 by a clipping effect. The sealing ring 2 is made in one piece from two materials. The upper hatched region, that is to say more particularly in the region of the protective sheathing 18, uses a thermoplastic material while an elastomer material is used in the region beneath the head 4, that is to say in particular in the region of the bead 15. In this case also the sealing ring 2 has a through opening 21 and is therefore not of such a configuration as to be closed upwardly, in order to permit a turning tool to be applied to the head 4 of the connecting element 3 for turning same.

Figure 5:
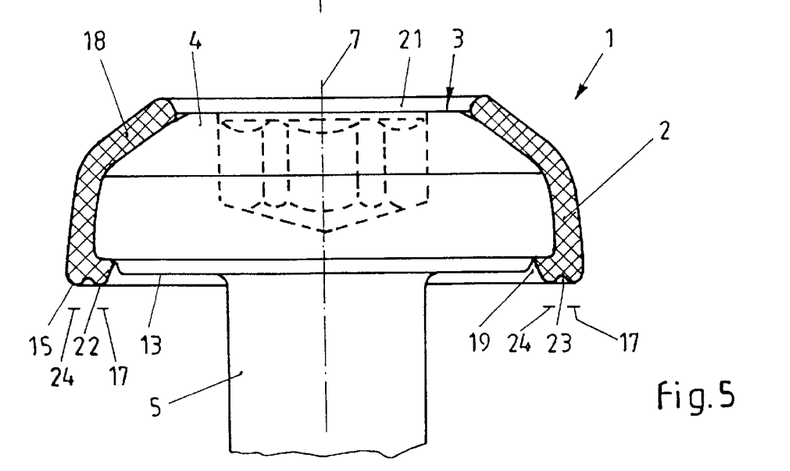
FIG. 5 shows yet a further embodiment of a protective ring having two beads.

Looking at FIG. 5 the embodiment of the protective ring 1 shown therein is identical in many areas with the embodiment shown in FIG. 4. The sealing ring 2 in this case however is made from the same material throughout, in addition, besides the first bead 15, disposed at a spacing relative thereto in the radial direction is a second bead 22 which is of a similar cross-section and a similar configuration to the bead 15. The second bead 22 thus extends radially inwardly of the first bead 15. Formed between the bead 15 and the bead 22 is an insulating chamber as indicated at 23, that is to say a recess which extends in a groove-like shape around the protective sheathing 18 in the downwardly facing surface thereof. When the biasing or tightening force is applied, the resulting permanent deformation of the first bead 15 gives rise to the formation of the sealing surface as indicated at 17, the radial extent of which relative to the axis 7 is illustrated in the form of a short line in FIG. 5. The second bead 22 is also deformed to afford a similar sealing surface as indicated at 24.

Figure 6:
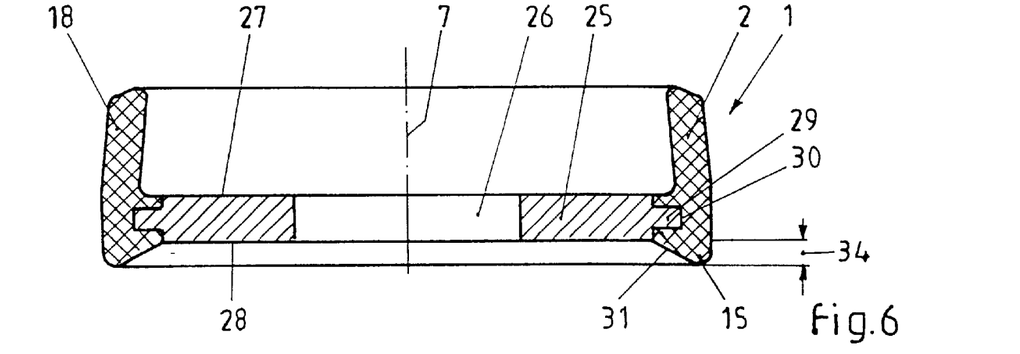
FIG. 6 shows another embodiment of a protective ring according to the invention which can be fitted between a connecting element and a component.

The embodiment of the protective ring 1 according to the invention as shown in FIG. 6 comprises two parts, more specifically a sealing ring as indicated at 2 of plastic material and a main body as indicated at 25 of metal. The main body 25 is of an annular disk-like configuration and, concentrically relative to the axis as indicated at 7, it has a through opening 26 which is matched to the diameter of the screwthreaded shank 5 of the connecting element 3, for the screwthreaded shank 5 to pass through the opening 26. The main body 25 has an upper bearing surface 27 which thus faces towards the bearing surfaces 13 at the underside of the head 4 of the connecting element 3. A bearing surface 28 is also provided on the other side, that is to say at the surface of the main body 25 which in use faces towards the component 8. It will be appreciated that, in the fitted condition of the connecting element 3, with interposition of the protective ring 1, on the component 8, the bearing surface 28 performs the function corresponding to the bearing surface 13 of the embodiment described above for example with reference to FIG. 1.

On its outer diameter the main body 5 has a peripherally extending rib 29 which projects in a radially outward direction and to which the sealing ring 2 is fitted by clipping engagement by means of a suitably shaped groove 30 provided in the inwardly facing surface of the sealing ring 2. In this case also the sealing ring 2 has a bead 15 which projects in the axial direction beyond the main body 25 and which in this embodiment has an inclinedly extending support surface as indicated at 31. The support surface 31 enlarges outwardly in a frustoconical configuration in the illustrated direction, so that at any event material of the sealing ring 2 is prevented from becoming clamped or jammed between the bearing surface 28 and the contact surface indicated at 16 on the component 8 in FIG. 1 for example, when the biasing or tightening force is applied. Due to the configuration of the inclinedly extending support surface 31, the sealing ring 2 is of a cross-section which can be referred to as a pivotal flange. To explain that term and what is involved here in functional respects, it will be seen that the axial compression of the bead 15 as occurs when the connecting element 3 is progressively tightened will cause a pivotal movement to be initiated on the upwardly extending protective sheathing 18, in a direction towards the outer periphery of the head 4 of the connecting element 3. That inward pivotal movement of the protective sheathing 18 is thus produced by the pivotal flange afforded by the cross-sectional configuration of the sealing ring 2. The inward movement of the protective sheathing 18 towards the outer periphery of the head 4 of the connecting element 3 produced or improves the pressing contact between the protective sheathing 8 and the head 4, and thus also the sealing contact between the two portions.

Figure 7:
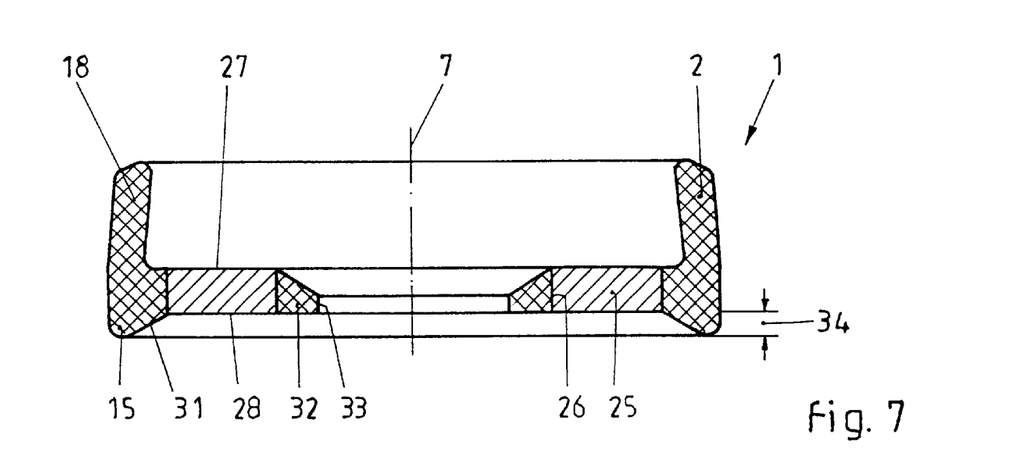
FIG. 7 shows a further embodiment of a protective ring.

With reference now to FIG. 7, the embodiment of the protective ring 1 shown therein comprises a main body 25 of metal and a sealing ring 2 of plastic material, which is fixed in this case by adhesive or vulcanization. Disposed in the through opening 26 in the main body 25 is a collar 32 which can comprise the same material as the sealing ring 2 and which is durably connected to the main body 25 in the same manner. The collar 32 is of an inside diameter which is somewhat smaller than the outside diameter of the screwthreaded shank 5 of the associated connecting element 3 so that the protective ring 1 can be pushed on to the connecting element 3 over the screwthreaded shank 5 thereof, but in the position of having been pushed on to the connecting element 3, it is then held non-releasably and thus non-losably on the connecting element 3.

In all the above-described embodiments of the invention the configuration is such that the bead 15 of the sealing ring 2 projects by a defined distance as indicated at 34 in FIG. 7 relative to the surface which defines the axial support for the sealing ring 2, that is to said relative to the bearing surface 28 of the embodiment shown in FIG. 7. The degree of compression of the head 15 is determined by the magnitude of the projection distance 34.

Figure 8:
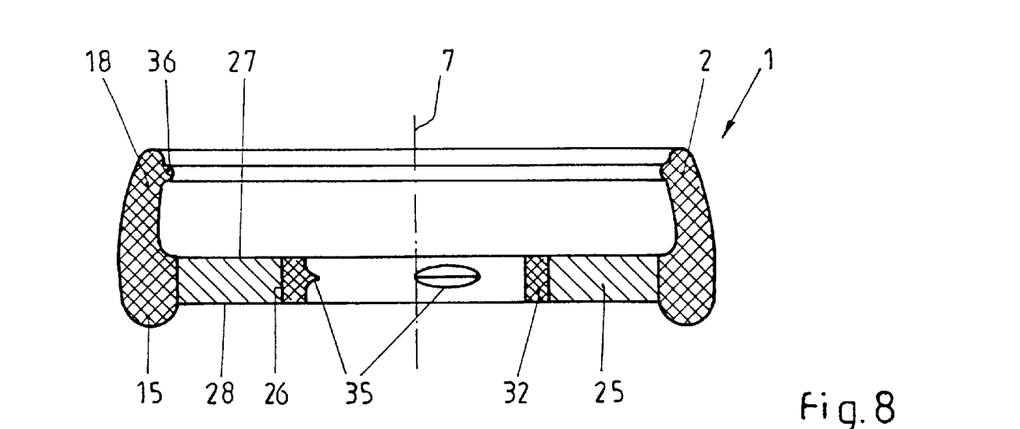
FIG. 8 shows still another embodiment of a protective ring according to the invention.

In the embodiment of the protective ring for resisting contact corrosion, as shown in FIG. 8, the protective ring 1 also has a collar as indicated at 32. Provided at the inner periphery of the collar 32 in an array distributed around the periphery thereof are a plurality of holding elements 35 which perform a similar function to the reduced diameter 33 of the collar 32 in the embodiment shown in FIG. 7. The embodiment of FIG. 8 has at least three resilient holding elements 35 which are arranged distributed around the inner periphery of the collar 32. The inner region of the protective sheathing 18 of the sealing ring 2 is provided with a sealing bead or ridge 36 which extends in the peripheral direction on the interior thereof and which also provides annular contact, over a surface area, against the outer periphery of the head 4 of the connecting element. That arrangement provides that the resilient contact pressure force of the sealing ring 3 in the region of the protective sheathing 18 is concentrated on to a smaller annular surface. A desirable modified form of this arrangement involves the combination of a support surface as indicated at 31 in FIGS. 6 and 7 and a sealing bead as indicated at 36 in FIG. 8, the cross-sectional configuration of the sealing ring 2 at the support surface 31 thus acting as a pivotal flange as described above, to enhance the action of affording sealing integrity by means of the sealing bead 36.

Figure 9:
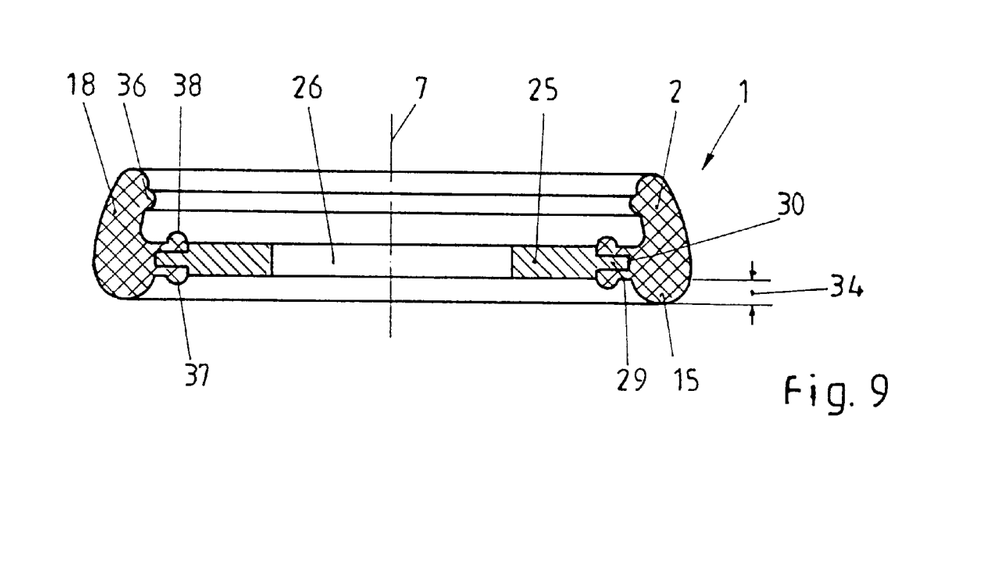
FIG. 9 shows still another embodiment of the protective ring according to the invention.

The embodiment shown in FIG. 9 has a sealing bead 36, in the region of the protective sheathing 18 on the radially inwardly facing surface thereof. The sealing ring 2 is otherwise fitted by means of clipping engagement by means of the groove 30 on to the radially outwardly extending, peripheral rib 29. Disposed in that region and extending outwardly on the top side and the underside are additional knob portions 37 and 38 by way of which the connection between the sealing ring 2 and the main body 25 is stabilized after the protective ring is assembled with the connecting element 3. The knob portions 37 and 38 may also be in the form of at least substantially continuous, peripherally extending ribs.

Figure 10:
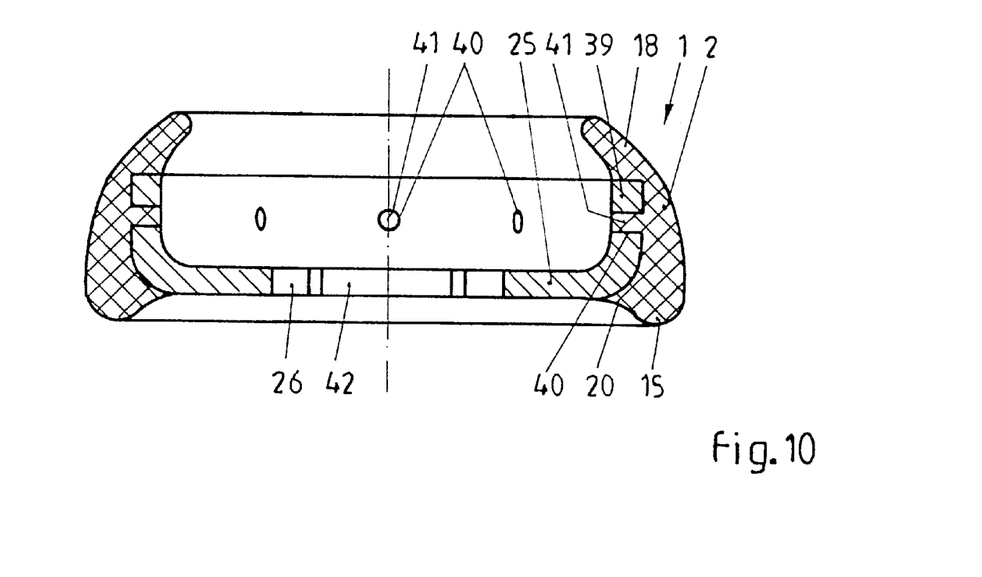
FIG. 10 shows a still further embodiment of the protective ring according to the invention.

Finally, reference will be made to FIG. 10 showing a last embodiment of the protective ring 1 comprising a metal main body 25 and a sealing ring 2 of elastomer material, which is fitted on to same. The main body 25 has a bent-over peripherally extending edge 39 which extends for a certain distance in the direction of the axis 7. Openings 40 are provided in the edge 39, distributed over the periphery thereof, and projections 41 on the sealing ring 2 engage into the openings 40. It will be appreciated that this connecting configuration can also be used directly in conjunction with the configuration of the head 4 of a connecting element 3. The sealing ring 2 may also have a clip-on engagement lip 20 adjoining the bead 15 which is of large surface area. In the region of the through opening 26 the main body 25 may have tongues 42 which project somewhat radially inwardly and which are formed from the material of the main body 25. The dimensions of the tongues 42 are such that a protective ring 1 of this kind can be fitted with its main body 25 on to the shank of a screw blank before or after the screwthread is produced thereof by a rolling operation, so that this also makes it possible to produce a non-detachable unit consisting of the connecting element 3 and the protective ring 1.

It will be noted that a common aspect of all the above-described embodiments of the protective ring 1 is that the are re-usable. The sealing ring 2 is used only within the limits of its resilient properties.

It will be appreciated that the above-described embodiments of the invention have been set forth solely by way of example and illustration of the principles thereof and that various further modifications and alterations may be made therein without thereby departing from the spirit and scope of the invention.

What is claimed is:

1. A protective ring for resisting contact corrosion for a connecting element adapted to be fitted to a component and having a bearing surface, sad protective ring comprising:
    a sealing ring of plastic material, said sealing ring in the non-fitted condition of the connecting element being supported on the connecting element;
    bead means being formed by said sealing ring and projecting in an axial direction beyond the bearing surface of the connecting element for bearing against the component;
    an annular sealing surface which upon fitting of said sealing ring and the connecting element is adapted to be permanently axially braced relative to the component, said annular sealing surface extending at a spacing around said contact surface between the connecting element and the component;
    protective sheathing means for the connecting element, said protective sheathing means projects in a direction opposite from said bead means; and
    an annular disk-like main body of metal, said main body having a through opening for the connecting element to pass therethrough, a bearing surface for the component, and a bearing surface for the connecting element.

2. The ring of claim 1, wherein said sealing ring is connected to said main body.

3. The ring of claim 1, wherein said main body has in the region of its through opening a collar of plastic material.

4. The ring of claim 1, wherein said main body has in the region of its through opening resilient holding elements of plastic material.

5. The ring of claim 1, wherein said sealing ring is connected to the connecting element as a pre-assemblable unit, and wherein said sealing ring on the one hand and the connecting element on the other hand are adapted to each other for mutual support in the axial direction.

6. The ring of claim 5, wherein said sealing ring has projection means, and the connecting element has recess means adapted to receive said projection means.

7. The ring of claim 1, wherein said sealing ring has a substantially radially extending pivotal flange on which are provided said axially projecting bead means and said protective sheathing means.

8. The ring of claim 1, wherein said projecting bead means on said sealing ring, in the non-fitted condition, has a support surface which is arranged inclinedly with respect to the axis of said sealing ring, and which when the connecting element is fitted bears increasingly against the component and in so doing forms a surface for sealing thereagainst.

9. The ring of claim 1, wherein said sealing ring has second bead means which also project axially therefrom, and which upon fitting of said sealing ring and the connecting element can be permanently axially braced relative to the component to form a second annular sealing surface which surrounds the contact surface between the connecting element and the component, and further including an insulating chamber between said first and second bead means.

10. A connecting element adapted to be fitted to a component and having a bearing surface, said connecting element comprising:
    a protective ring for resisting contact corrosion for said connecting;
    said protective ring including a sealing ring of plastic material, said sealing ring in the non-fitted condition of the connecting element being supported on the connecting;
    bead means being formed by said sealing ring and projecting in an axial direction beyond the bearing surface of the connecting element for bearing against the component;
    an annular sealing surface which upon fitting of said sealing ring and the connecting element is adapted to be permanently axially braced relative to the said annular sealing surface extending at a spacing around said contact surface between the connecting element and the component;
    protective sheathing means for the connecting element, said protective sheathing means projecting a direction opposite from said bead means; and
    an annular disk-like main body of metal, said main body having a through opening for the connecting element to pass therethrough, a bearing surface for the component, and a bearing surface for the connecting element.

* * * * *